(12) United States Patent
Leutwyler et al.

(10) Patent No.: US 8,763,986 B2
(45) Date of Patent: Jul. 1, 2014

(54) SANITARY FITTING HAVING A COVERING ELEMENT FOR PROTECTING A CONTROL CARTRIDGE

(75) Inventors: André Leutwyler, Reinach (CH); Christian Gautschi, Reinach (CH)

(73) Assignee: KWC AG, Unterkulm (CH)

( * ) Notice: Subject to any disclaimer, the term of this patent is extended or adjusted under 35 U.S.C. 154(b) by 211 days.

(21) Appl. No.: 13/369,742

(22) Filed: Feb. 9, 2012

(65) Prior Publication Data

US 2012/0204344 A1 Aug. 16, 2012

(30) Foreign Application Priority Data

Feb. 16, 2011 (CH) .......................................... 272/11

(51) Int. Cl.
*F16K 31/44* (2006.01)
(52) U.S. Cl.
USPC ............ 251/214; 251/218; 251/235; 137/801
(58) Field of Classification Search
USPC ................. 251/214, 218, 231, 233, 235, 237; 137/625.4, 625.41, 625.17, 801; 4/675–678
See application file for complete search history.

(56) References Cited

U.S. PATENT DOCUMENTS

| | | | | |
|---|---|---|---|---|
| 2,313,128 | A * | 3/1943 | Densten | 251/215 |
| 3,804,367 | A * | 4/1974 | Johnson | 251/235 |
| 3,965,935 | A * | 6/1976 | Morisseau | 137/625.4 |
| 6,442,776 | B1 * | 9/2002 | Oberdorfer | 4/677 |
| 2004/0069966 | A1 * | 4/2004 | Amidzich | 251/231 |
| 2006/0180216 | A1 * | 8/2006 | Gaenzle et al. | 137/625.4 |
| 2009/0120518 | A1 * | 5/2009 | Harsch et al. | 137/625.17 |
| 2009/0256096 | A1 | 10/2009 | Graber | |

FOREIGN PATENT DOCUMENTS

| | | |
|---|---|---|
| DE | 31 20 171 A1 | 1/1983 |
| DE | 9 214 042 U1 | 12/1992 |
| EP | 0 061 562 B1 | 10/1982 |
| EP | 0 982 441 B1 | 3/2000 |
| EP | 1 219 878 A2 | 7/2002 |
| EP | 2 110 586 A1 | 10/2009 |

OTHER PUBLICATIONS

Jun. 26, 2009 Swiss Search Report in Appln. No. CH00272/11 w/partial translation.

* cited by examiner

*Primary Examiner* — John K Fristoe, Jr.
*Assistant Examiner* — Jessica Cahill
(74) *Attorney, Agent, or Firm* — Oliff PLC

(57) ABSTRACT

The sanitary fitting has a control cartridge which is arranged in an end region of a fitting housing and defines a longitudinal axis (A). The control cartridge and an end, on this side, of the fitting housing are covered by a fitting cap. The fitting cap has a through-passage, through which an actuating shaft of the control cartridge is connected to an actuating lever which is arranged outside the fitting cap, said actuating shaft being pivotable about a pivot axis (B) that runs at right angles to the longitudinal axis (A). A deformable, annular covering element according to the invention is fastened by way of a first rim, facing the control cartridge, to a supporting ring arranged on the control cartridge, and engages in a sealing manner by way of a second rim around the actuating shaft or a connecting element seated thereon.

14 Claims, 2 Drawing Sheets

SANITARY FITTING HAVING A COVERING ELEMENT FOR PROTECTING A CONTROL CARTRIDGE

This application claims priority to Swiss Patent Application No. 2011 0272/11, filed Feb. 16, 2011, the entire disclosure of which is herein incorporated by reference in its entirety.

BACKGROUND

The present invention relates to a sanitary fitting.

A sanitary fitting of this kind is known from the document EP 0 061 562 B1. The sanitary fitting has a control cartridge which is arranged in an end region of a fitting housing and defines a longitudinal axis, and is covered by a fitting cap at an end, on this side, of the fitting housing. The fitting cap has a through-passage, through which an actuating shaft, as part of the control cartridge, is connected to an actuating lever which is arranged outside the fitting cap, said actuating shaft being pivotable about a pivot axis that runs at right angles to the longitudinal axis.

SUMMARY

A problem with sanitary fittings of this kind is the poorly protected ingress of contaminants into the interior of the control cartridge, since the through-passage in the fitting cap, together with a necessary gap between the fitting cap and the actuating lever, allows ingress into the interior of the control cartridge. Although the necessary gap prevents the fitting cap from being scratched when the actuating lever is actuated into an open or closed position of the control cartridge, it is possible for contaminants to penetrate into the interior of the control cartridge through the necessary gap and the through-passage in the fitting cap. In particular at highly frequented locations, such as in public buildings or in industry, for example, strong cleaning agents are usually used for cleaning sanitary fittings. These strong cleaning agents can penetrate into the control cartridge and cause damage there.

It is therefore an object to develop a sanitary fitting of the generic type such that operational reliability is ensured even when strong cleaning agents are used for cleaning.

This object is achieved by way of a sanitary fitting.

Exemplary embodiments include a sanitary fitting having a control cartridge which is arranged in an end region of a fitting housing and defines a longitudinal axis. The control cartridge and an end, on this side, of the fitting housing are covered by a fitting cap. The fitting cap has a through-passage, through which an actuating shaft of the control cartridge is connected to an actuating lever which is arranged outside the fitting cap, said actuating shaft being pivotable about a pivot axis that runs at right angles to the longitudinal axis. A deformable, annular covering element according to the invention is fastened by way of a first rim, facing the control cartridge, to a support ring arranged on the control cartridge, and engages in a sealing manner by way of a second rim around the actuating shaft, or a connecting element seated thereon. By means of the covering element, contaminants are prevented from penetrating into the interior of the control cartridge.

Preferably, the deformable, annular covering element is rubber-elastic, resistant to cleaning agent and produced from a crosslinked thermoplastic elastomer based on olefin (TPE-V), also known as TPV, and is predominantly a composite composed of polypropylene (PP) and ethylene-propylene-diene rubber (EPDM). Furthermore, the covering element is preferably formed in a hood-like manner. In addition, the covering element is formed preferably as a thin, flexible and tear-resistant membrane.

In a further embodiment, the control cartridge has at least one retaining element, preferably a spring finger, which projects in the direction of the fitting cap and by means of which the support ring is retained.

Easy mounting of the support ring is possible by means of the spring finger. In order to fasten the support ring, it is, of course, also conceivable to use a plurality of spring fingers, which hold the support ring in the desired position.

In a further embodiment, the actuating shaft is rotatable about the longitudinal axis.

This allows a combination of a rotary movement and a pivoting movement of the actuating shaft. Usually, the temperature of the water emerging from the sanitary fitting is set by way of the rotary movement of the actuating shaft and usually the water throughflow is controlled by the pivoting movement of the actuating shaft.

In a further embodiment, the retaining element and the support ring are rotatable about the longitudinal axis together with the actuating shaft.

This has the advantage that twisting of the deformable, annular cover element in the installed state is prevented.

In a further embodiment, an annular bead which projects in the direction of the fitting cap is integrally formed on the support ring.

This makes it easier to fasten the deformable, annular covering element on the support ring and also confers increased stability on the latter.

In a further embodiment, the annular bead has a circumferential annular groove, into which the first rim of the covering element engages.

This provides a defined position for the first rim of the covering element.

In a further embodiment, the annular groove is open radially on the outside and preferably the first rim of the covering element is in the form of a circumferential retaining bead.

This has the advantage that the first rim of the covering element is retained securely in the annular groove and the inherent elasticity of the circumferential retaining bead results in additional self-securing.

In a further embodiment, the fitting cap is fastened to the support ring.

This can take place for example by simple mounting. It is particularly advantageous for the support ring to be rotatable about the longitudinal axis together with the actuating shaft, since, in this simple manner, the fitting cap also automatically co-rotates.

In a further embodiment, the support ring has an external lateral surface having at least one holding recess, into which a retaining lug of the fitting cap engages. Preferably the retaining lug is integrally formed on a, for example lug-shaped, fastening element of the fitting cap.

This makes it easier to fasten the fitting cap on the support ring. Preferably, the retaining lug is formed in an identical, but opposite, way to the holding recess. This ensures that twisting is prevented between the support ring and the fitting cap. If necessary, the fitting cap can be fastened only in one predetermined direction on the support ring. A corresponding arrangement of the holding recess on the support ring can ensure that the mounting of the fitting cap on the support ring allows only one defined mounting direction.

In a further embodiment, a slot through the support ring, said slot extending at least approximately in the circumferential direction, is assigned to the holding recess, radially on the inside with regard to the latter, in order to form a leaf spring.

This makes it possible for the holding recess to yield and snap in automatically during the mounting of the fitting cap. Of course, mounting in the opposite direction is also possible, by the retaining lug being integrally formed on the support ring and the lug-shaped fastening element having the identical but opposite holding recess. The spring function could also be taken over by the fastening element.

In a further embodiment, the second rim of the covering element is in the form of a circumferential sealing bead.

A particular advantage of the material of the covering element is the rubber-elastic property, so that the sealing bead contracts again on account of pulling forces and can fit closely in a correspondingly sealing manner. Of course, it is also possible to provide a groove for holding the sealing bead, it being possible for said groove to be present on the connecting element or on the actuating shaft.

In a further embodiment, a connecting element is seated on the actuating shaft, the actuating lever being fastened to and the second rim of the covering element resting in a sealing manner against said connecting element.

Gentle and particularly easy mounting of the actuating lever is possible by means of the connecting element. It is also conceivable for the connecting element to be arranged directly on the actuating lever or to be connected integrally thereto.

In a further embodiment, the support ring has on its radially inner rim an annular part which projects on one side toward the fitting cap and on the other side toward the control cartridge.

This allows the actuating shaft to engage through the annular part in the direction of the fitting cap and allows the pivoting movement for opening and closing the control cartridge. Furthermore, the annular part can be fastened to the control cartridge. That part of the annular part that is directed toward the control cartridge has a sealing action, and so contaminants are additionally prevented from penetrating into the interior of the control cartridge.

In a further embodiment, a spring lug is integrally formed at the free end of the spring finger and interacts with that end of the annular part that faces the fitting cap, in order to retain the annular part in abutment against the control cartridge.

This ensures that the annular part rests against the control cartridge in a sealing manner.

BRIEF DESCRIPTION OF THE DRAWINGS

Further advantages can be gathered from the following description of exemplary embodiments, which are explained by way of the drawings, in which, in a purely schematic manner.

DETAILED DESCRIPTION OF EMBODIMENTS

Figure 1:
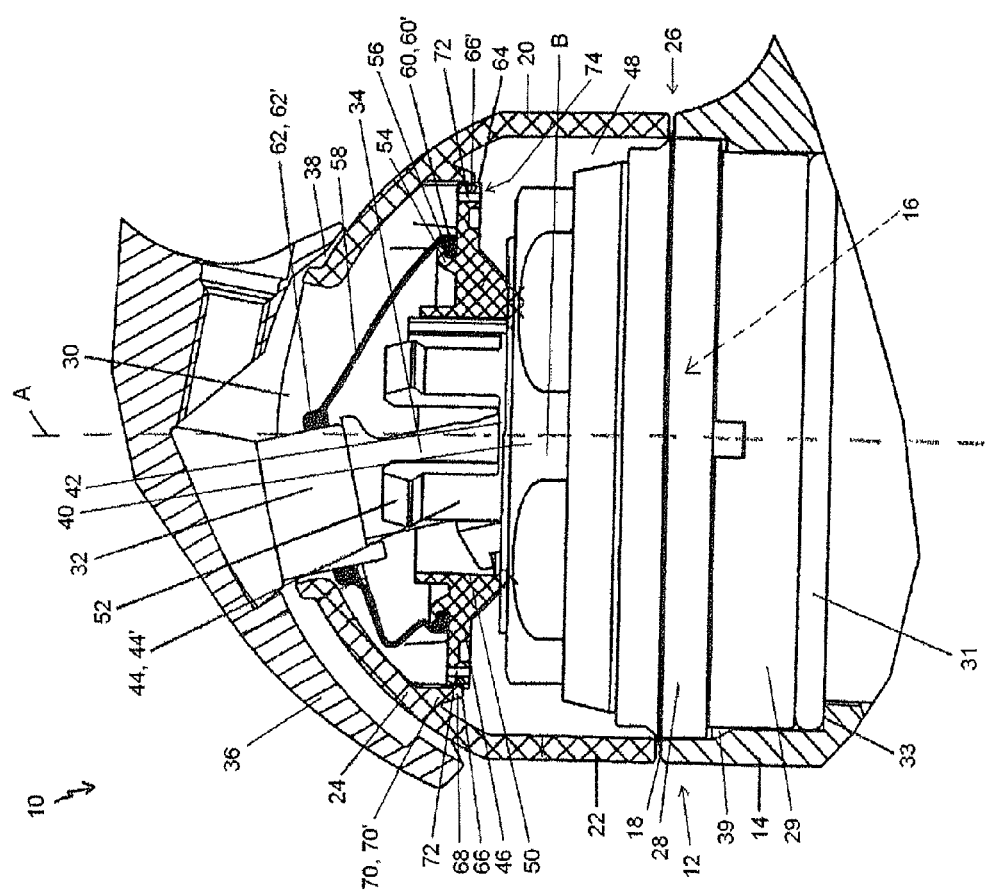
FIG. 1 shows a partial longitudinal section through a part of a sanitary fitting according to the invention, illustrating a view of a control cartridge in the open position.

The sanitary fitting 10 shown in FIG. 1 has, in an end region 12 of a fitting housing 14, a control cartridge 16 (to be seen only in FIG. 2, for which reason the reference line is dashed in FIG. 1), which defines a longitudinal axis A, and an end 18, on this side, of the fitting housing 14 is covered by a fitting cap 20.

The fitting cap 20, which in the present case is in one piece, has a cylindrical part 22 and a spherical-capshaped part 24.

The cylindrical part 22 of the fitting cap 20 is separated from the end 18, on this side, of the fitting housing 14 via a thin gap 26. A support ring 28 is arranged between the fitting housing 14 and the fitting cap 20 and prevents the lateral penetration of contaminants through the thin gap 26. The external surface of the cylindrical part 22 is aligned with the external surface of the fitting housing 14 at the end 18.

The spherical-cap-shaped part 24 of the fitting cap 20 has a slot-like through-passage 30. In the exemplary embodiment show, a connecting element 32 engages through the slot-like through-passage 30 and the connecting element 32 is seated firmly on an actuating shaft 34 of the control cartridge 16, with the actuating shaft 34 being pivotable about a pivot axis B that extends at right angles to the longitudinal axis A. Outside the fitting cap 20, an actuating lever 36 is fastened to the connecting element 32 in a known manner by means of a grub screw.

In the open position of the control cartridge 16 according to FIG. 1, the actuating lever 36 has been pivoted up and water flows in a known manner through the control cartridge 16 at a defined water throughflow.

Figure 2:
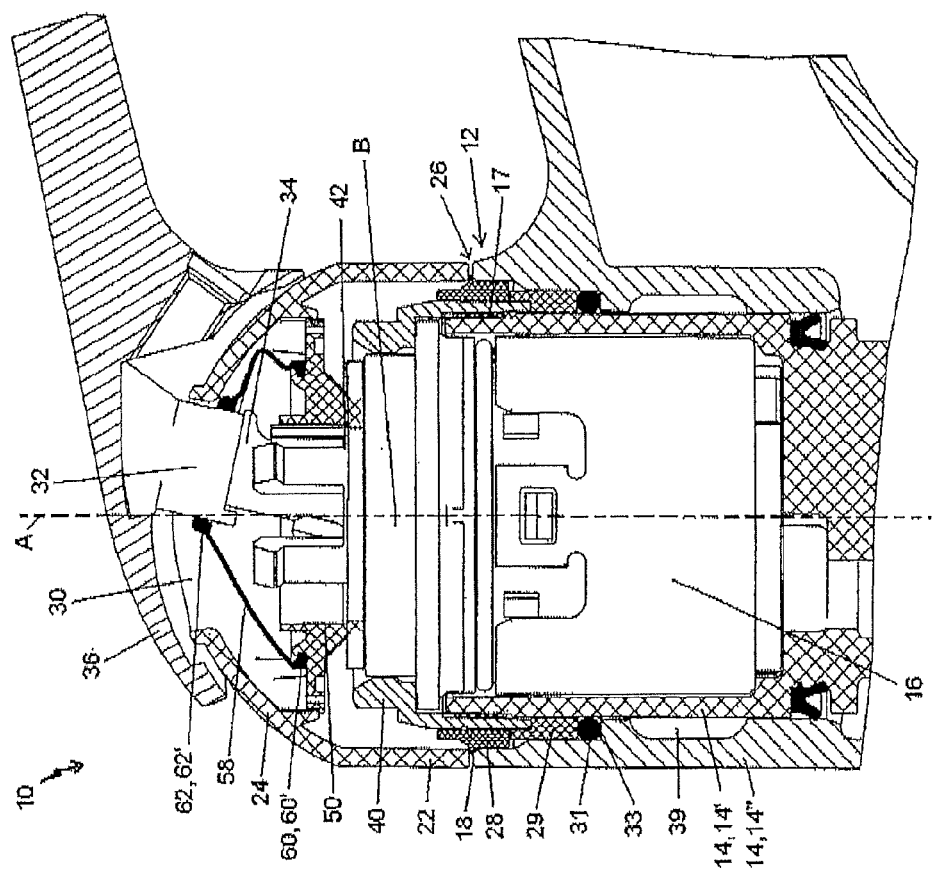
FIG. 2 shows, in a similar illustration to FIG. 1, a longitudinal section through the housing of the sanitary fitting and a view of the control cartridge in the closed position.

In the closed position of the control cartridge 16 according to FIG. 2, the actuating lever 36 has been pivoted down and the water throughflow through the control cartridge 16 has been stopped.

Basically, the slot-like through-passage 30 through the fitting cap 20 has to allow the actuating shaft 34 to perform its pivoting movement fully, so that it is possible to open and close the control cartridge 16 satisfactorily by means of the actuating lever 36 outside the fitting cap 20.

Although the actuating lever 36 completely covers the through-passage 30 through the fitting cap 20 in every pivoting position, it is possible for contaminants to be able to pass between the fitting cap 20 and the actuating lever 36 through a necessary gap 38 and into the interior of the control cartridge 16. The necessary gap 38 prevents the fitting cap 20 from being scratched during the pivoting movement of the actuating lever 36 in use.

The control cartridge 16, which is arranged in an interior space 39 of the fitting housing 14, is installed in a known manner. In the present case, the fitting housing 14, as illustrated in detail in FIG. 2, consists of an inner housing 14' and an outer housing 14". The inner housing 14' is connected by means of a thread 17 to a ring nut 40 which holds the control cartridge 16 in position in a known manner in the interior space 39 of the fitting housing 14. Arranged between the ring nut 40 and the cylindrical part 22 of the fitting cap 20 and also the outer housing 14" is the support ring 28, as explained above. Arranged between the inner housing 14' and the outer housing 14" is a sliding ring 29 which rests against an O-ring 31. The O-ring 31 in turn rests against a radially inner shoulder 33 of the outer housing 14" and thus additionally protects the interior space 39 of the fitting housing 14 against contaminants. The sliding ring 29 centers the outer housing 14", which is rotatable on the fixed inner housing 14' about the longitudinal axis A.

Arranged on the control cartridge 16 in the direction of the fitting cap 20 is a ring 42 (shown with dashed lines in FIG. 2) which co-rotates with the actuating shaft 34. The co-rotating ring 42 of the control cartridge 16 has in the present case four retaining elements 44, which project in the direction of the fitting cap 20, are in the form of spring fingers 44' and are arranged parallel, to the longitudinal axis A A disk-shaped support ring 46 is arranged on the co-rotating ring 42 of the control cartridge 16 in an interior space 48 delimited by the fitting cap 20 and has on its radially inner rim an annular part 50 which projects on one side in the direction of the fitting cap 20 and on the other side in the direction of the control cartridge 16. In addition, the annular part 50 allows the actuating shaft 34 of the control cartridge 16 to engage through and pivot.

The spring fingers 44' are arranged firmly on the co-rotating ring 42 of the control cartridge 16 and engage through the annular part 50 of the support ring 46 in the direction of the fitting cap 20. Integrally formed at the free end of the spring fingers 44' is a respective spring lug 52 which interacts with that end of the annular part 50 which faces the fitting cap 20, in order to retain the annular part 50 in a sealing manner against the co-rotating ring 42 of the control cartridge 16.

A circumferential annular bead 54 is integrally formed on the disk-shaped support ring 46 in a manner projecting in the direction of the fitting cap 20. The circumferential annular bead 54 has a circumferential annular groove 56 which is open radially toward the outside.

A deformable annular covering element 58 is preferably rubber elastic, hood-like and in the form of a thin, flexible and tear-resistant membrane. The covering element 58 has a first rim 60, which is formed in a manner facing the control cartridge 16 and preferably as a retaining bead 60', and a radially inner second rim 62, which is formed preferably as a sealing bead 62'. On account of the inherent elasticity of the rubber-elastic material, which is produced preferably from TPE-V, or TPV, the retaining bead 60' of the first rim 60 of the covering element 58 is retained automatically in the circumferential annular groove 56 of the annular bead 54 of the support ring 46 and the circumferential sealing bead 62' of the second rim 62 of the covering element 58 contracts and fits closely in a correspondingly circumferential and a sealing manner against the connecting element 32.

Of course, it is also conceivable for the circumferential sealing bead 62' of the second rim 62 of the covering element 58 itself to rest against the actuating shaft 34 or for the connecting element 32 to have a circumferential groove (not shown), in which the circumferential sealing bead 62' engages.

As can be seen from FIGS. 1 and 2, the deformable, annular covering element 58 is installed in an untensioned manner upon each pivoting movement of the actuating shaft 34. This has the advantage that the covering element 58 is never under tension and thus there is also no risk of tearing or of retention being lost.

In the exemplary embodiment shown, the fitting cap 20 is fastened to the support ring 46. To this end, the support ring 46 has a radially outer lateral surface 64 having at least one holding recess 66, preferably six recesses. Preferably, two holding recesses 66, 66' are arranged in a diametrically opposed manner. However, it is also conceivable to provide more than two holding recesses 66, 66', 66" (third not shown) so that an unambiguous assignment and mounting direction is possible during the fastening of the fitting cap 20 on the support ring 46.

A retaining lug 68 of the fitting cap 20, said retaining lug 68 pointing radially inward, engages in the holding recess 66 of the support ring 46 and is integrally formed on a fastening element 70, which is configured here as a fastening lug 70', of the fitting cap 20.

A slot 72 through the support ring 46, said (length-limited) slot extending at least approximately in the circumferential direction, is assigned to the holding recess 66 of the support ring 46, radially on the inside with regard to said holding recess 66, so that that part of the support ring 46 which supports the holding recess 66 forms a leaf spring 74. Correspondingly, it is very easy to mount the fitting cap 20 on the support ring 46, since when the retaining lug 68 of the fitting cap 20 interacts with the holding recess 66 of the support ring 46, the leaf spring 74 yields radially inward, and the restoring force of the leaf spring 74 leads to snap closure between the fitting cap 20 and the support ring 46.

It is also possible to arrange the support ring 46 firmly on the control cartridge 16. This is the case in particular when the actuating shaft 34 is only pivotable, but not rotatable.

What is claimed is:

1. A sanitary fitting comprising:
a control cartridge defining a longitudinal axis (A) and having an actuating shaft being pivotable around an axis (B) that runs at right angles to the longitudinal axis (A);
a fitting housing having an end and an end region, wherein the control cartridge is arranged in the end region of the fitting housing,
a fitting cap covering the end of the fitting housing and having a through-passage;
an actuating lever that is arranged outside the fitting cap and is connected to the actuating shaft through the through-passage;
a support ring arranged on the control cartridge; and
a deformable, annular covering element having a first rim and a second rim, the deformable, annular covering element being fastened by way of the first rim, facing the control cartridge, to the support ring, and engages in a sealing manner by way of the second rim around the actuating shaft, or a connecting element seated thereon, in order to prevent contaminants from penetrating into the control cartridge, wherein
the control cartridge has at least one retaining element, and
the actuating shaft is rotatable about the longitudinal axis (A) and the retaining element and the support ring are rotatable about the longitudinal axis (A) together with the actuating shaft.

2. The sanitary fitting as claimed in claim 1, wherein the at least one retaining element is a spring finger, which projects in the direction of the fitting cap.

3. The sanitary fitting as claimed in claim 1, wherein the fitting cap is fastened to the support ring.

4. The sanitary fitting as claimed in claim 1, wherein the second rim of the covering element is in the form of a circumferential sealing bead.

5. The sanitary fitting as claimed in claim 1, wherein the actuating lever is fastened to the connecting element and the second rim of the covering element is resting in a sealing manner against the connecting element.

6. The sanitary fitting as claimed in claim 1, wherein the support ring has on its radially inner rim, an annular part which projects on one side toward the fitting cap and on the other side toward the control cartridge.

7. The sanitary fitting as claimed in one of claim 1, wherein the support ring further comprises an annular bead that is integrally formed on the support ring and projects in the direction of the fitting cap.

8. The sanitary fitting as claimed in claim 7, wherein the annular bead has a circumferential annular groove, into which the first rim of the covering element engages.

9. The sanitary fitting as claimed in claim 8, wherein the annular groove is opened on the radial outer side.

10. The sanitary fitting as claimed in claim 9, wherein the first rim of the covering element is in the form of a circumferential retaining bead.

11. A sanitary fitting comprising:
a control cartridge defining a longitudinal axis (A) and having an actuating shaft being pivotable around an axis (B) that runs at right angles to the longitudinal axis (A);

a fitting housing having an end and an end region, wherein the control cartridge is arranged in the end region of the fitting housing;

a fitting cap covering the end of the fitting housing and having a through-passage;

an actuating lever that is arranged outside the fitting cap and is connected to the actuating shaft through the through-passage;

a support ring arranged on the control cartridge; and a deformable, annular covering element having a first rim and a second rim, the deformable, annular covering element being fastened by way of the first rim, facing the control cartridge, to the support ring, and engages in a sealing manner by way of the second rim around the actuating shaft, or a connecting element seated thereon, in order to prevent contaminants from penetrating into the control cartridge, wherein wherein the fitting cap is fastened to the support ring, and the support ring has an external lateral surface having at least one holding recess, into which a retaining lug of the fitting cap engages.

12. The sanitary fitting as claimed in one of claim 11, wherein the fitting cap has a fastening element, and the retaining lug is integrally formed on the fastening element of the fitting cap.

13. The sanitary fitting as claimed in claim 11, wherein the support ring defines a slot, the slot extending at least approximately in the circumferential direction, is assigned to the holding recess, radially on the inside with regard to the latter, forming a leaf spring.

14. A sanitary fitting comprising:

a control cartridge defining a longitudinal axis (A) and having an actuating shaft being pivotable around an axis (B) that runs at right angles to the longitudinal axis (A);

a fitting housing having an end and an end region, wherein the control cartridge is arranged in the end region of the fitting housing;

a fitting cap covering the end of the fitting housing and having a through-passage;

an actuating lever that is arranged outside the fitting cap and is connected to the actuating shaft through the through-passage;

a support ring arranged on the control cartridge; and a deformable, annular covering element having a first rim and a second rim, the deformable, annular covering element being fastened by way of the first rim, facing the control cartridge, to the support ring, and engages in a sealing manner by way of the second rim around the actuating shaft, or a connecting element seated thereon, in order to prevent contaminants from penetrating into the control cartridge, wherein the control cartridge has at least one retaining element, the at least one retaining element is a spring finger, which projects in the direction of the fitting cap, and the support ring has on its radially inner rim, an annular part which projects toward the fitting cap and a spring lug is integrally formed at a free end of the spring finger and interacts with an end portion of the annular part, in order to retain the annular part against the control cartridge.

\* \* \* \* \*